(No Model.) 2 Sheets—Sheet 1.
C. L. MILLER.
VENETIAN BLIND.
No. 578,346. Patented Mar. 9, 1897.
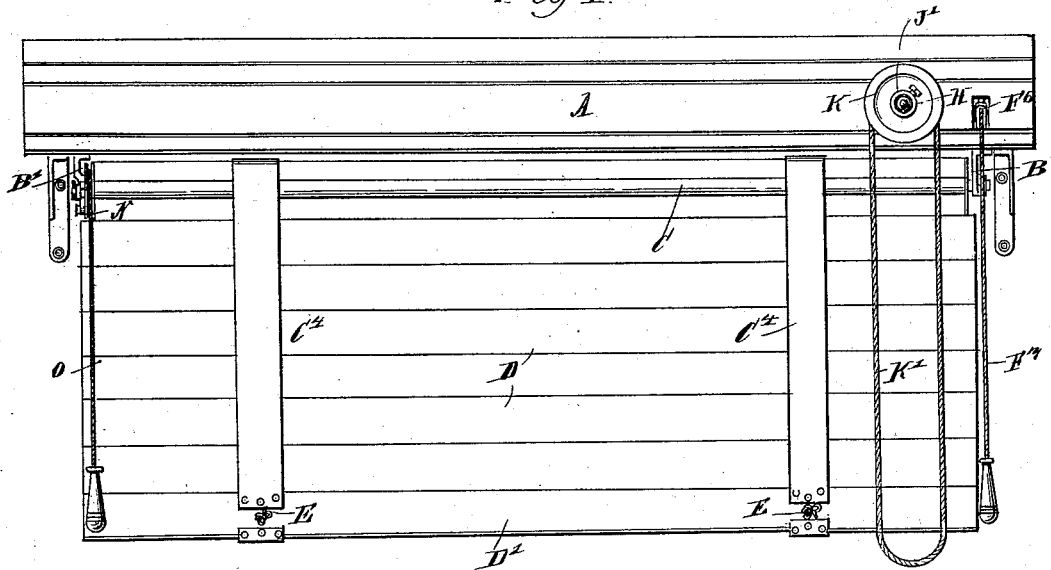
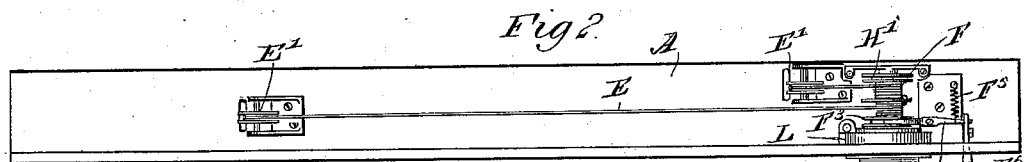
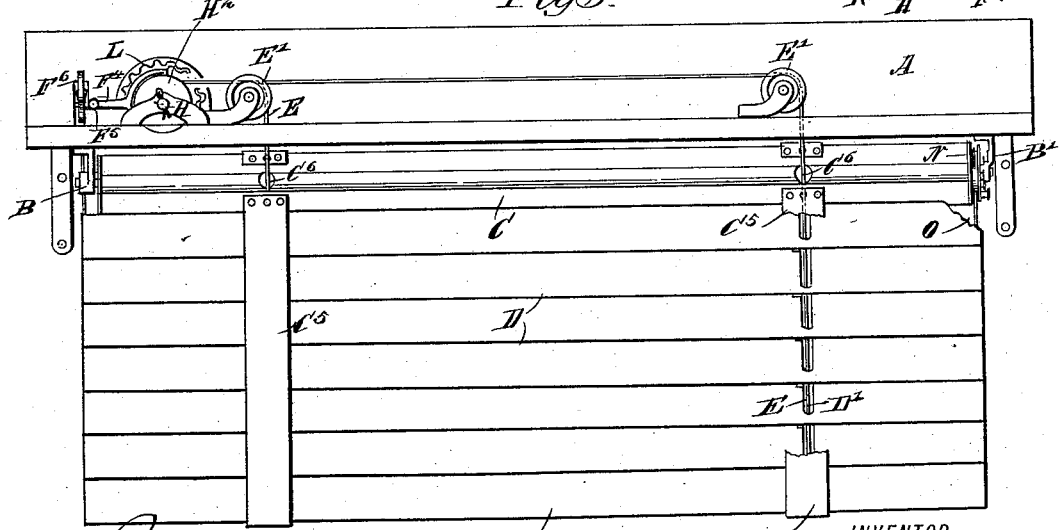

(No Model.) 2 Sheets—Sheet 2.
C. L. MILLER.
VENETIAN BLIND.
No. 578,346. Patented Mar. 9, 1897.
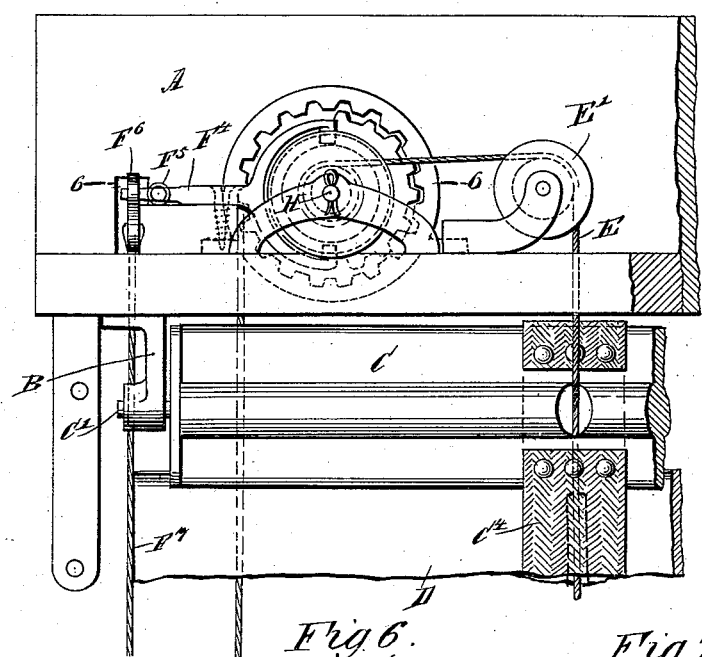
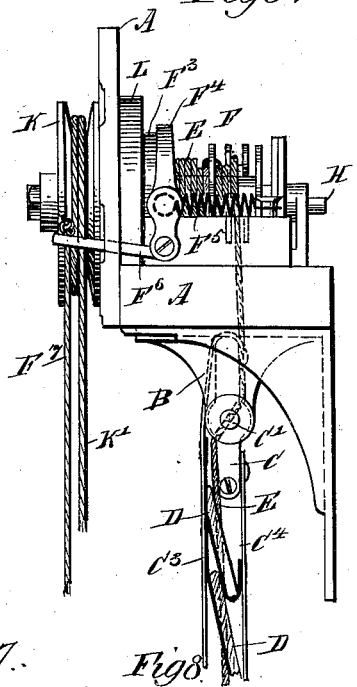
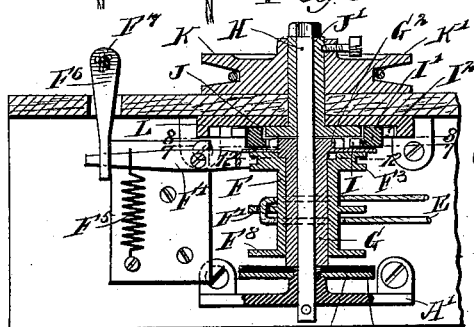
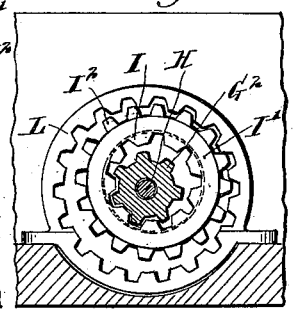
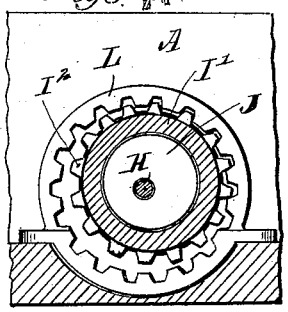
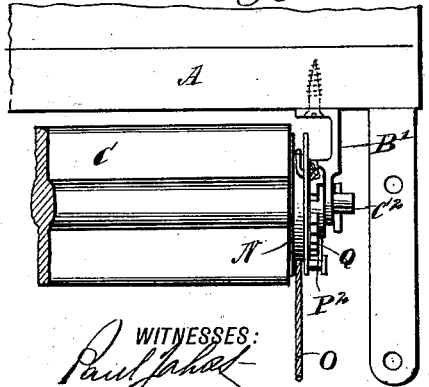
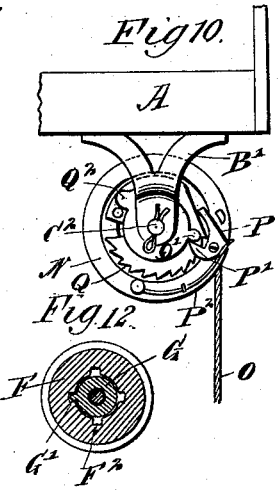
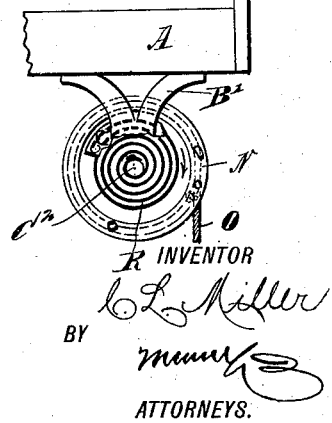
WITNESSES:
Paul Jahnel
Rev. G. Hooster
INVENTOR
C. L. Miller
BY
ATTORNEYS.

UNITED STATES PATENT OFFICE.

CHARLES L. MILLER, OF NEW YORK, N. Y.

VENETIAN BLIND.

SPECIFICATION forming part of Letters Patent No. 578,346, dated March 9, 1897.

Application filed June 20, 1896. Serial No. 596,271. (No model.)

*To all whom it may concern:*

Be it known that I, CHARLES L. MILLER, of New York city, in the county and State of New York, have invented certain new and useful Improvements in Venetian Blinds, of which the following is a full, clear, and exact description.

The object of the invention is to provide certain new and useful improvements in Venetian blinds whereby the slats can be conveniently raised and lowered and turned at any desired angle to admit or shut out light and air.

The invention consists principally of a drum adapted to wind up or unwind a rope, cable, chain, or the like and carrying a pinion in mesh with internal gear-teeth on a revoluble eccentric also formed with external gear-teeth rolling off on a fixed internal gear-wheel.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same. Fig. 3 is a rear elevation of the same with parts broken out. Fig. 4 is an enlarged rear elevation of part of the raising and lowering device for the slats. Fig. 5 is an end elevation of the same. Fig. 6 is a sectional plan view of the same on the line 6 6 of Fig. 4. Fig. 7 is a sectional side elevation of part of the same on the line 7 7 of Fig. 6. Fig. 8 is a similar view of the same on the line 8 8 of Fig. 6. Fig. 9 is an enlarged rear elevation of the device for changing the positions of the slats. Fig. 10 is an end elevation of the same. Fig. 11 is a similar view of the same with parts removed, and Fig. 12 is a sectional side elevation of the clutch mechanism for the drum.

The improved Venetian blind is provided with the usual top cross-bar A, forming part of the frame of the window on which the blind is used. On the under side of the bar A and near the ends thereof are secured brackets B and B', in which are journaled the trunnions C' and C² of the top slat C, provided on opposite sides with the downwardly-extending sets of tabs C⁴ and C⁵, carrying the slats D in the usual manner, so that when the top slat C is turned in the brackets B and B' then the slats D are opened and closed to admit or shut out light and air.

On the lowermost slat D' are secured the ends of a cord E for raising and lowering the slats D, the said cord E extending from its ends upwardly through elongated apertures D² and C⁶, formed in the slats D and C. The two runs of the cord then pass through an opening in the bar A and over pulleys E', journaled on the top of the bar, as plainly indicated in Figs. 2 and 3.

The cord E then passes to and around a drum F, formed with a central flange F', so as to keep the two runs of the cord separated, the cord also passing from one part of the drum to the other through an opening formed in the said flange F', as plainly indicated in Fig. 6. When the slats D are lowered, then the cord E is completely unwound from the drum F, the cord then simply passing through the opening in the flange F', as indicated in Fig. 6, and when the operator revolves the drum to wind up the cord then any slack in any one of the runs is readily taken up by the cord slipping through the aperture in the said flange before simultaneous winding up of the two runs of the cord takes place on the drum. By this arrangement the slats D will always be lifted uniformly at both ends, so that they properly fold one on top of the other. The drum F is mounted to rotate loosely and to slide laterally on a sleeve G, held loosely on a transversely-extending pin or shaft H, supported by a suitable bracket A' on the bar A. (See Fig. 6.)

The sleeve G is adapted to be locked to the drum F by a suitable clutch, preferably in the form of a pin G', extending peripherally from the sleeve and engaging one of a series of apertures F², formed in the forward end of the drum F. (See Figs. 6 and 12.) On the sleeve G and at the forward end thereof is formed or secured a pinion G² in mesh with internal gear-teeth I, formed or secured on an eccentric I', engaged by an eccentric-disk J, formed with a hub J', mounted to rotate loosely on the shaft or pin H. On the forward end of the hub J' is secured a pulley or sprocket-wheel K, engaged by an endless rope or chain K', hanging downward in front of the slats, as plainly shown in Fig. 1, so as to be within convenient reach of the operator, who by pulling on either of the runs can raise and lower the slats, as hereinafter more fully described. The eccentric I' is also formed with external gear-teeth $I^2$, rolling off on an internal gear-wheel L, fixed to the bar A and concentric with the pinion $G^2$ and the pin H. (See Figs. 7 and 8.)

Now it will be seen that when the several parts are in the position shown in Figs. 6, 7, and 8 then the operator by pulling the rope K' rotates the pulley K and consequently the hub J' and eccentric J, so that the eccentric I' is moved around, whereby its external gear-teeth I roll off on the internal fixed gear-wheel L, and this rotary motion of the gear-teeth $I^2$, eccentric I', and internal gear-teeth I causes a rotating of the pinion $G^2$ on the sleeve G. Now as this sleeve G is connected by the clutch-pin G' with the drum F it is evident that the latter is rotated, and consequently a winding up or unwinding of the slat-hoisting cord E takes place to raise or lower the slats D, according to which of the runs of the rope K' is pulled by the operator.

The sleeve G can be moved out of engagement with the clutch-pin G', and for this purpose one end of the sleeve is formed with a screw-flange $F^3$, engaged by a shifting fork $F^4$, pressed on by a spring $F^5$, and connected with a bell-crank lever $F^6$, having one arm extending forwardly through an opening in the bar A. The outer end of this arm is connected with a rope $F^7$, depending downwardly on one side of the blind, as plainly shown in Fig. 1, so that when the operator pulls on this rope $F^7$ he causes a swinging of the bell-crank lever $F^6$ and the shifting fork $F^4$ to move the drum F rearwardly out of engagement with the pin G' and in engagement at its rear flange $F^8$ with a friction-disk $H^2$, held on the plate H', secured to the pin H. By this arrangement the operator can lower the slats without manipulating the rope K', provided the weight of the slats is sufficient to cause an automatic unwinding of the cord E from the drum F.

It is understood that the flange $F^8$ and disk $H^2$ form a friction-brake under the control of the operator having hold of the cord $F^7$, so as to prevent a too sudden dropping of the slats D whenever the drum F is moved out of engagement with the clutch-pin G'.

In order to move the slats D, D', and C into a partly open or closed position, I turn the top slat C so that the tabs $C^4$ and $C^5$ move the slats D and D' into the desired position—that is, the same position as that given to the top slat C. Now in order to conveniently turn the latter I provide one end thereof with a fixed pulley N, over which passes a cord O, extending down from the pulley N in front of the slats, as indicated in Fig. 1.

On the outer face of the pulley N is fulcrumed a pawl P, (see Fig. 10,) adapted to engage a ratchet-wheel Q, formed on the bracket B', so that the operator on pulling on the cord O can turn the pulley N and slat C, and at the same time move the pawl P in engagement with the fixed ratchet-wheel Q, so as to hold the several parts in position.

The pawl P is provided with an arm P', serving to throw the pawl out of engagement with the ratchet-wheel whenever desired to insure a return movement of the slat C to a normal vertical position. For this purpose the arm P' of the pawl P is adapted to engage lugs Q' and $Q^2$, formed on the bracket B', as plainly shown in Fig. 10, and arranged approximately diametrically opposite each other to disengage the pawl P from either end of the ratchet-wheel.

A spring R, connected at one end with the trunnion $C^2$, is connected at its other end to the bracket B', so that the slat C is always returned to a normal vertical position whenever the pawl P is disengaged from the ratchet-wheel Q and the operator releases the cord O.

When the several parts are in a normal position, as shown in Figs. 1, 3, 9, and 10, and the operator desires to wholly or partly open the several slats, then he pulls on the cord O, so as to rotate the pulley N and slat C until the desired position is reached, the operator then releasing the pull on the cord O to permit the pawl P to snap into the corresponding teeth of the ratchet-wheel Q, so as to hold the several parts locked in an open or partly open position. Now when the operator desires to again bring the slats back to their normal position he pulls on the cord O still further to finally move the arm P' of the pawl P in engagement with the fixed lug $Q^2$ to cause the said pawl to swing outwardly clear of the ratchet-wheel.

The operator on releasing the pull on the cord O now permits the spring R to return the pulley N and slat C to their normal position. When the arm P' finally comes in contact with the lug Q', then the pawl P is again swung inwardly to be ready to engage the teeth of the ratchet-wheel Q on the next turning of the pulley N by the operator pulling the cord O. Thus it will be seen that the slats can be readily opened and closed and held in the desired position as long as desired.

It is understood that by the construction of the special mechanism for rotating the drum F the operator is enabled to raise and lower the slats to any desired position by manipulating the cord K', but as soon as the operator releases the said cord then the several parts are all locked in place to securely hold the slats in whatever position they may be in. This is due to the fact that the pinion $G^2$, the eccentric I', with its internal and external gear-teeth I and $I^2$, and the stationary internal gear-wheel L, together with the eccentric J, form a locking device to prevent turning of the drum F after the operator releases the cord.

It will further be seen that by the arrangement described but a slight exertion on the part of the operator is required in manipulating the cord K' to raise or lower the slats D and D'.

Having thus described my invention, I claim as new and desire to secure by Letters Patent—

1. The combination with a series of slats adapted to be folded one on top of the other, of a hoisting-cord connected with the bottom slat, and a drum having a central flange formed with an aperture for the passage of the said hoisting-cord, the latter being adapted to wind and unwind on the said drum, substantially as shown and described.

2. A device of the class described, provided with a hoisting-drum formed with a central flange having an aperture for the passage of the hoisting-cord, to permit the latter to equalize and to wind up the two runs of the hoisting-cord on the two parts of the drum separated by the said flange, substantially as shown and described.

3. A device of the class described, comprising a drum adapted to wind up and unwind a cord, rope, cable, chain or the like, a pinion held on the said drum, an eccentric mounted to rotate and provided with internal gear-teeth in mesh with the said pinion and also provided with external gear-teeth, and a fixed internal gear-wheel in mesh with the said external gear-teeth to permit the latter to roll off on the fixed internal gear-wheel, substantially as shown and described.

4. A device of the class described, comprising a series of slats, a hoisting-cord connected with the bottom slat, a drum mounted to revolve and adapted to wind up and unwind the said hoisting-cord, and a mechanism for rotating the said drum in either direction and locking it in this position, the said mechanism comprising a pinion rotating with the said drum, an eccentric mounted to rotate and formed with internal gear-teeth in mesh with the said pinion and also provided with external gear-teeth, and a fixed internal gear-wheel in mesh with the said external gear-teeth, substantially as shown and described.

5. A device of the class described, comprising a series of slats, a hoisting-cord connected with the bottom slat, a drum mounted to revolve and adapted to wind up and unwind the said hoisting-cord, a mechanism for rotating the said drum in either direction and locking it in this position, the said mechanism comprising a pinion rotating with the said drum, an eccentric mounted to rotate and formed with internal gear-teeth in mesh with the said pinion and also provided with external gear-teeth, and a fixed internal gear-wheel in mesh with the said external gear-teeth, and means substantially as described, for turning the said eccentric in either direction, as set forth.

6. A device of the class described, comprising a series of slats, a hoisting-cord connected with the bottom slat, a drum for winding up and unwinding the said hoisting-cord, a shifting lever for disengaging the said drum from its rotating mechanism, and a stationary friction-disk adapted to be engaged by a flange of the said drum, substantially as shown and described.

7. A device of the class described, comprising a series of slats, a top slat, tabs connecting the said top slat with the series of slats, means substantially as described, for turning the said top slat into an open, partly open or closed position, the said means comprising a pulley held on the top slat, a pull-cord for the said pulley, a spring for returning the said pulley to a normal position, a pawl carried by the pulley, and a fixed ratchet-wheel adapted to be engaged by the said pawl, as set forth.

8. A device of the class described, comprising a series of slats, a top slat, tabs connecting the said top slat with the series of slats, means substantially as described, for turning the said top slat into an open, partly open or closed position, the said means comprising a pulley held on the top slat, a pull-cord for the said pulley, a spring for returning the said pulley to a normal position, a pawl carried by the pulley, and a fixed ratchet-wheel adapted to be engaged by the said wheel, and a releasing device for the said pawl, consisting of two fixed lugs adapted to be engaged by an arm on the said pawl, substantially as shown and described.

9. A device of the class described, comprising a spring-pressed pulley attached to the top slat, a pull-cord connected with the said pulley, a pawl fulcrumed on the face of the said pulley and formed with an arm, a spring pressing the said pawl, a fixed ratchet-wheel adapted to be engaged by the said pawl, and fixed lugs adapted to be engaged by the arm of the said pawl, substantially as shown and described.

CHARLES L. MILLER.

Witnesses:
THEO. G. HOSTER,
JNO. M. RITTER.